United States Patent [19]

Swersky

[11] Patent Number: 5,024,481

[45] Date of Patent: Jun. 18, 1991

[54] WIND BAFFLE ADJUSTABLE FOR DIFFERENT CAR WIDTHS

[76] Inventor: Robert S. Swersky, 72 Short Way, Roslyn, N.Y. 11577

[21] Appl. No.: 586,681

[22] Filed: Sep. 24, 1990

[51] Int. Cl.[5] .............................................. B62D 39/00
[52] U.S. Cl. .................................. 296/180.1; 296/97.1
[58] Field of Search .................... 296/180.1, 97.1, 97.6

[56] References Cited

U.S. PATENT DOCUMENTS

| | | | |
|---|---|---|---|
| 2,629,626 | 2/1953 | Ziler | 296/97.6 |
| 4,767,147 | 8/1988 | Kobayakawa et al. | 296/180.1 |
| 4,842,321 | 6/1989 | Baumert et al. | 296/97.1 |
| 4,850,637 | 7/1989 | Carlino | 296/180.1 |

FOREIGN PATENT DOCUMENTS 340796 11/1989 European Pat. Off. ......... 296/180.1

Primary Examiner—Margaret A. Focarino
Assistant Examiner—Gary C. Hoge
Attorney, Agent, or Firm—Steinberg & Raskin

[57] ABSTRACT

A wind baffle adjustable for different car widths has a sheet of substantially rigid, transparent material, an adjustable length rod having ends attachable to the respective inner side body surfaces of a convertible automobile, and a set of ring clips for affixing the adjustable length rod to the transparent sheet such that the sheet can be held in place behind the front seat compartment to prevent wind currents from passing from the rear of the automobile through the spaces between the front seats and headrests into the front seat compartment. The baffle includes an optional sunvisor extender.

22 Claims, 4 Drawing Sheets

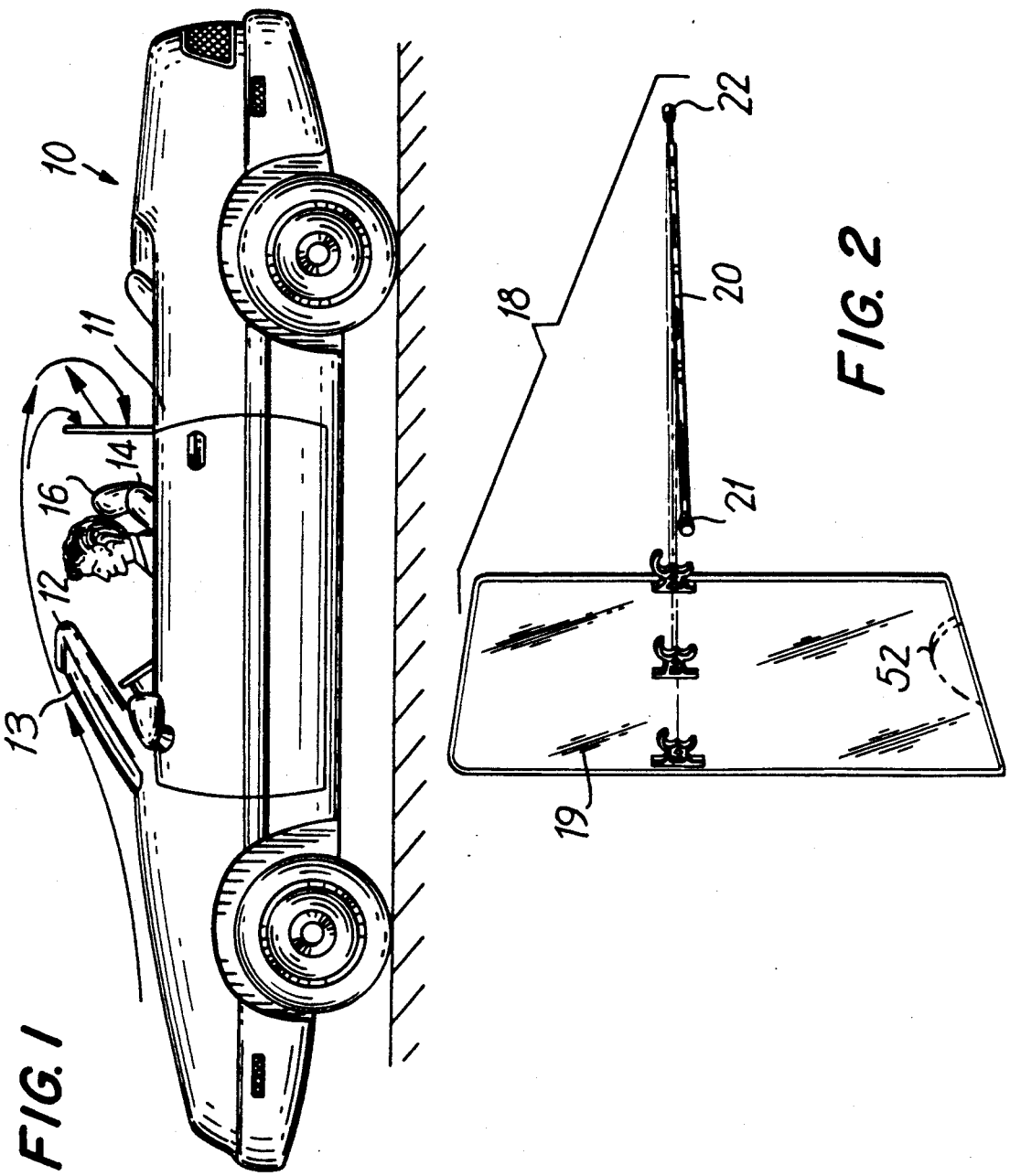

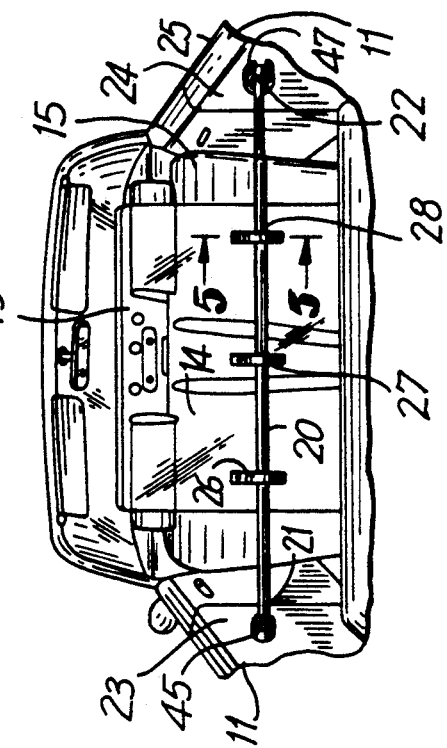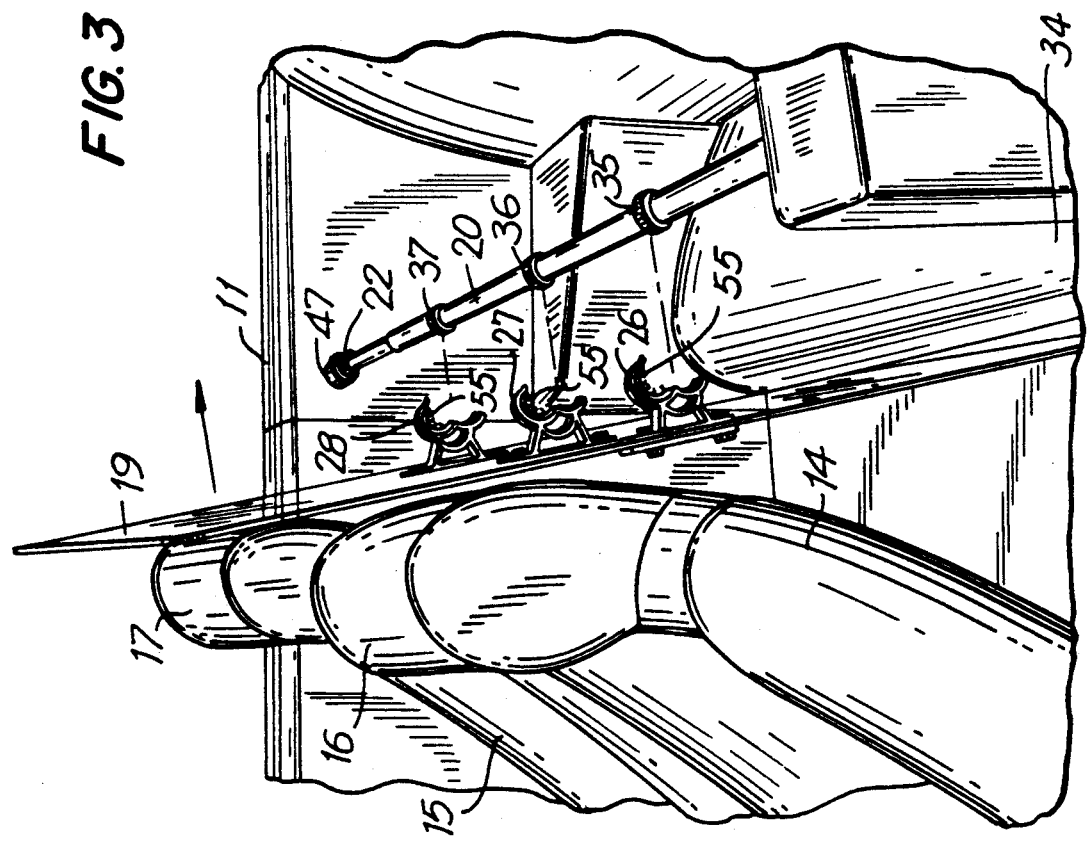

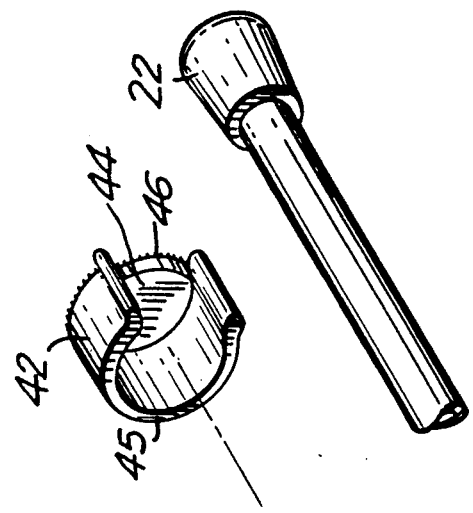
FIG. 6
FIG. 7
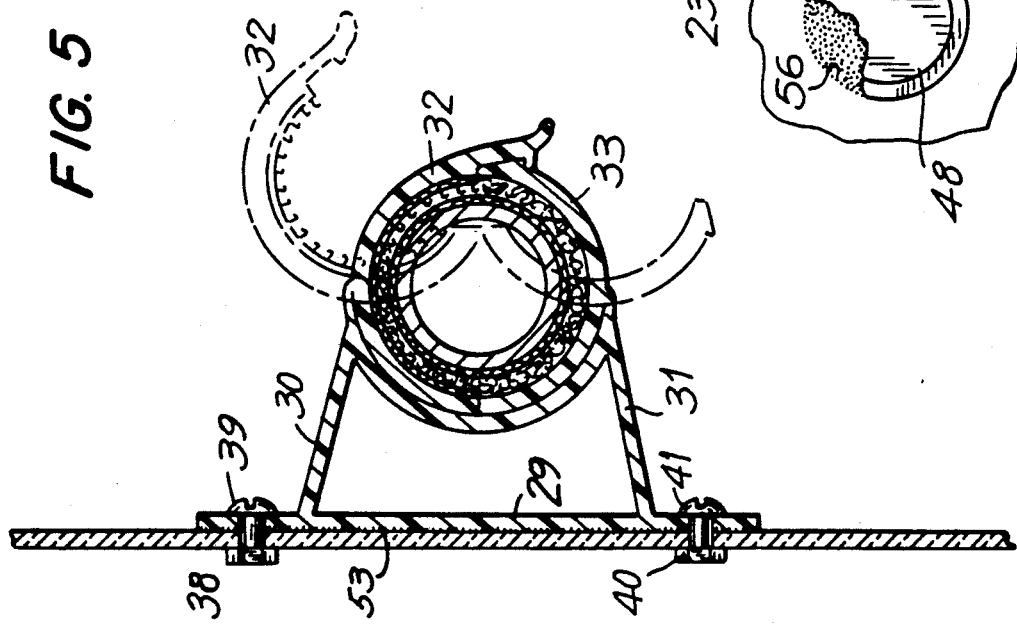
FIG. 5

WIND BAFFLE ADJUSTABLE FOR DIFFERENT CAR WIDTHS

BACKGROUND OF THE INVENTION

The present invention relates to a wind baffle which is adapted to be removably installed behind the front seat of a convertible automobile and which is adjustable for different automobile widths.

A problem which has existed since the introduction of convertible automobiles has been that, with forward motion of the automobile, air flows up and over the windshield and front seat area, thus producing a lower air pressure zone in the front seat area. Consequently, reverse air currents travel between the front seats and head rests producing turbulence. These reverse air currents can have negative effects ranging from disturbing the hair styles of the front seat occupants to chilling the occupants on cool days to disturbing loose articles such as papers which have been left in the front seat area.

Various attempts to solve the aforementioned problem have included those in European Patent Application 0 233 777, filed by Kobayakawa, et al. and in U.S. Pat. No. 3,246,923, issued to J. E. Turner.

SUMMARY OF THE INVENTION

It is therefore an object of the present invention to provide a wind baffle which prevents wind currents from passing from the rear of a convertible automobile between the front seats and headrests into the front seat compartment.

Another object of the present invention is to provide a wind baffle which is adjustable for different widths of automobiles.

Still another object of the present invention is to provide a wind baffle which, when mounted in place, allows for the top of a convertible automobile to be raised or lowered.

Yet another object of the present invention is to provide a wind baffle which improves the acoustics of a convertible automobile such that music and conversation are more easily heard in the front seat area.

Still another object of the present invention is to provide a wind baffle which improves the retention of air conditioning or heating air in the front seat areas.

Another object of the present invention is to provide a wind baffle which is quickly and easily removable from an automobile and which, when removed, leaves no trace of its presence in the automobile.

These and other objects of the present invention which will become apparent from the following description are achieved by the wind baffle of the present invention which comprises a sheet of substantially rigid, transparent material, an adjustable length rod having ends which are attachable to the respective inner side surfaces of a convertible automobile, and means for affixing the rod to the sheet such that the sheet can be held in place behind the front seat compartment to prevent wind currents from passing from the rear of the convertible automobile between the front seats and head rests to the front seat compartment.

The aforementioned adjustable rod can be a spring-biased curtain rod with the attachable ends being rubber appliques or closet pole sockets. As mentioned previously, it confers the advantage of allowing the wind baffle to be used with different widths of automobiles.

In another embodiment of the invention the aforementioned affixing means comprises a plurality of ring clips such as SUPER KLIPS ®, a plurality of self-sticking strips which can be made of VELCRO ® for adhering the inside of the respective ring clips to the curtain rod at desired locations thereon, with the outside of each ring clip having a flat surface for attaching it to the substantially rigid, transparent sheet, which may be made of plexiglass.

As an optional feature of the invention, the wind baffle can comprise a tinted sunvisor extender positioned as a bridge between the automobile's sunvisors. Strips of self-sticking material such as VELCRO ® can be attached along the upper surface of the automobile's visors to facilitate the attachment of the extender thereto.

BRIEF DESCRIPTION OF THE DRAWINGS

FIG. 1 is a side elevational view of a convertible automobile having the wind baffle of the present invention mounted therein;

FIG. 2 is a perspective view of the various components of the wind baffle;

FIG. 3 is a perspective view showing the components of FIG. 2 in a ready to mount position in a convertible automobile;

FIG. 4 is a rear view showing the wind baffle of the present invention in a mounted position;

FIG. 5 is a sectional view along the lines 5—5 of FIG. 4;

FIG. 6 is an exploded view showing the components of the closet pole socket used to mount one end of the adjustable rod of the wind baffle on an interior side wall of the convertible automobile;

FIG. 7 is an elevational view of the closet pole socket used to mount the other end of the adjustable rod to an opposite interior side wall of the automobile;

DESCRIPTION OF THE PREFERRED EMBODIMENTS

Figure 8:
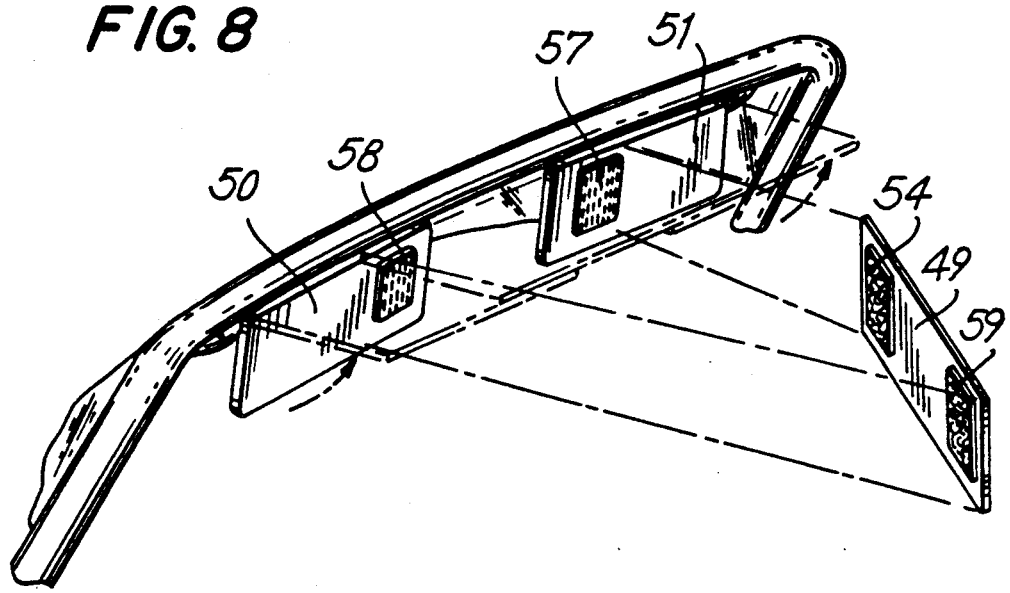
FIG. 8 is a rear perspective exploded view of the sunvisor extender which is an optional feature of the invention.

Referring to the drawings, wherein like reference characters designate identical or corresponding parts throughout the various views, FIG. 1 shows a convertible automobile generally designated 10 having opposite side wall body portions 11 extending from the front to the rear of the automobile, as well as a windshield assembly 12 comprising a windshield 13 over which, when the automobile is in forward motion, wind currents are deflected and caused to flow over the front seat passenger compartment, thus creating a lower air pressure zone therein.

As shown in FIG. 2, the wind baffle 18 comprises a sheet 19 of transparent, substantially rigid material, and an adjustable length rod 20 having ends 21, 22 mounted thereon which are respectively attachable to the inner sides 23, 24 of the side body parts 11, 25 (FIG. 4). As shown in FIG. 2, sheet 19 has an arcuate dotted line 52 in its lower central area to indicate that, since the sheet 19 when in place is resting on the floor of the rear seat compartment of the automobile, a cutout can be made in the bottom edge of the sheet to accommodate the central hump which extents from the front to the back of certain automobiles as an enclosure for the drive shaft. As shown in FIG. 1, the wind baffle 18 prevents reverse air currents from traveling from the rear of the car between the front seats and the head rests, thus preventing turbulence within the front seat area.

As shown in FIG. 3, the rear of the front seat compartment is defined by front seats 14 and 15 having respective headrests 16 and 17. Also, as shown in FIG. 3, the rod 20, which can be a telescoping, spring-biased curtain rod, holds the transparent sheet 19, which can be plexiglass, in place by means of a plurality of connecting ring clips 26, 27, and 28. These ring clips can be SUPER KLIPS ®, as mentioned previously. As shown best in FIG. 5, each of these SUPER KLIPS ® has a flat base portion 29 to which legs 30 and 31 are integrally attached. Arcuate section 32 moves from its open position (shown in phantom in FIG. 5) to snap together with arcuate section 33 and thus close the ring clip around rod 20.

In a preferred embodiment of the invention, the width of the rigid transparent sheet is made such that it extends between the approximate centers of the respective front seat headrests 16 and 17. Such an arrangement yields the advantageous features of making it convenient for a person in the front seat to place items such as packages on a shelf or seat in the rear compartment and enables sound originating in the rear compartment, e.g. from a stereophonic speaker, to be easily heard in the front seat compartment. Using a wider sheet would diminish or eliminate these advantages. On the other hand, use of a narrower sheet leads to a greater, perhaps unacceptable, level of turbulence in the front seat compartment. The height of the rigid sheet is determined by the distance between the base of the back seat (in a four seater automobile) or the parcel shelf (in a two seater automobile), in a location just above the drivers' seat. Reference numeral 34 is used to generically designate a rear seat or parcel shelf, as shown in FIG. 3.

The method of attachment of the transparent sheet 19 to the adjustable length rod 20 is shown in FIG. 4. As shown therein, the transparent sheet 19 has been put in place in the rear seat compartment such that its bottom rests against the base of the parcel shelf or rear seat 34, and the adjustable length rod 20 has been adjusted such that its ends 21, 22, which can be rubber tips, support it securely against the inner side walls 23, 24 of the automobile body, with three lengths 35, 36, and 37 of a self-sticking material such as VELCRO ® being respectively attached at appropriately spaced locations on adjustable length rod 20. These appropriately spaced locations are preferably at the center of sheet 19 and at two points equidistant from the center and proximate to the outside edge of the sheet 19.

As shown best in FIG. 5, the ring clips 26–28 are respectively attached to the sheet 19 by means of a plurality of nuts and bolts 38–41 after having been first attached to the sheet 19 by an adhesive tape 53. Washers (not shown) on each side of the sheet 19 facilitate the nut and bolt connection. The ring clips 26–28 are attached to the sheet 19 at respective locations which coincide with the VELCRO ® strips 35–37 attached to adjustable length rod 20. As shown in FIGS. 3 and 5, sheet 19 is mounted on rod 20 by pivoting the sheet 19 about the base of the parcel shelf or rear seat 34 such that the ring clips 26–28 snap onto the rod 20 with the respective VELCRO ® strips 55 mounted on the inner surfaces of the arcuate sections of the ring clips mating with the VELCRO ® lengths 35–37 on the rod 20. This attachment method produces a very secure connection between the ring clips and the rod and also prevents the rod from rotating.

FIGS. 6 and 7 respectively show closet pole sockets 42 and 43 which in a preferred embodiment of the invention are used for securing ends 22, 21 of rod 20 to the interior side walls 24, 23 of convertible automobile 10. Closet pole socket 42 comprises a bottom 44 with a C-shaped member 45 integrally attached thereto. The bottom 44 of the closet pole socket 42 is attached to the interior side wall 24 of the automobile (not shown) by means of a double sided adhesive tape 46. As shown in FIG. 6, the tip 22 of the adjustable rod 20 can be easily snapped into or out of the opening in the C-shaped member 45. The orientation of the C-shaped member tends to prevent the rod 20 from sliding forward toward the front of the automobile.

FIG. 7 shows closet pole socket 43 comprising a bottom 48, and an 0-shaped member 47 integral with the bottom 48. In the drawing, part of the 0-shaped member 47 has been cut away to show a double sided adhesive tape 56 affixing closet pole socket 43 to the interior side wall 23 of the automobile.

The closet pole sockets 42 and 43 respectively shown in FIGS. 6 and 7 have been designed such that they, together with the rest of the wind baffle, can be removed from the automobile without leaving any trace markings on the body thereof such as would be left, e.g., by screw holes in the interior side body walls if mounting brackets were used with the closet pole sockets.

Figure 9:
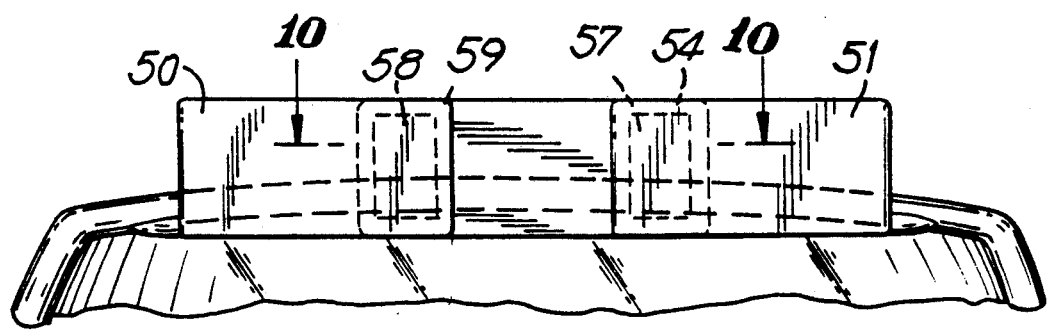
FIG. 9 is a bottom plan view of the sunvisor extender of FIG. 8 with the sunvisor in an up position.
Figure 10:
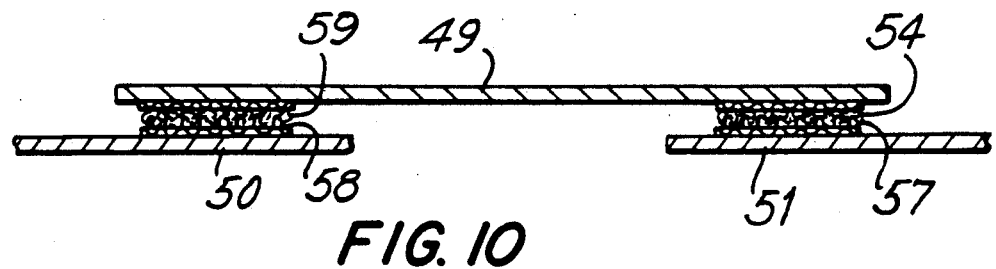
FIG. 10 is a sectional view along the lines 10—10 of FIG. 9.

FIGS. 8–10 describe a sunvisor extender which can be used to enhance the effectiveness of the wind baffle of the present invention. This sunvisor extender is not used in the manner of the commercially available sunvisor extenders which are clipped onto the bottom of individual sunvisors to provide an extra zone of protection from the sun's rays for the front seat occupants of the automobile. Instead, as shown in FIGS. 8–10, the sunvisor of the present invention comprises a bridging member 49 which traverses the gap between sunvisors 50 and 51 and which is attachable by its respective VELCRO ® strips 54 and 59 to mating VELCRO ® strips 57 and 58 on sunvisors 50 and 51. The sunvisor extender of the present invention has unexpectedly proven to enhance the capability of the wind baffle to reduce turbulence within the front seat compartment of a convertible automobile.

A preferred method of assembly of the wind baffle hereinbefore described would comprise the following steps.

First, the size of the plexiglass or acrylic sheet 19 in a preferred embodiment can be ascertained by measuring from the midpoint of one headrest to the other to determine the width, and measuring from the base of the back seat or parcel shelf to just above the driver's head to determine the height. The sheet 19 can then be centered behind the front seat headrests 16 and 17.

After placement of the rod 20, which is of adjustable length and thus can accommodate different car widths, such that its ends 21, 22 respectively support it securely against interior side walls 23 and 24, three positions can be marked respectively on both the rod 20 and sheet 19 which are, in a preferred embodiment, at the center of the sheet, and at two points equidistant from the center toward the edge of the sheet. VELCRO ® strips 35, 36, and 37 can then be attached to the rod.

The next step is to respectively place ring clips 26–28 (which can be SUPER KLIPS ®) which have respective lengths 55 of a self-sticking material such as VELCRO ® on the inner surface of their arcuate sections with the VELCRO ® lengths being of the hook or loop type to mate with the VELCRO ® lengths 35-37 mounted on the adjustable rod 20 such that rings clips 26-28 are respectively snapped around VELCRO ® lengths 35-37 with the flat portions of the ring clips respectively facing forward toward the sheet 19.

The rod 19 or 20 is then moved forward or back until the plexiglass sheet 19 is standing in a substantially vertical position as it contacts the respective flat faces of ring clips 26-28. Then a coating can be removed from adhesive tape 53 on the ring clips and the sheet 19 can be pressed against the flat surfaces of ring clips 26-28 with an upright alignment.

The next steps in the assembly of the wind baffle of the present invention comprise the attachment of the closet pole sockets 42, 43 to the interior side wall of the automobile, the insertion of the rod 20 into the closet pole sockets, and the further attachment of the sheet 19 to the rod 20 by means of drilling holes through the sheet 19 to correspond with holes in the flat face of the base portion 29 of each of the ring clips, and then the use of a bolt, a nut and two washers (one on each side) to secure the plexiglass to the SUPER KLIP ® at each hole.

As an optional feature of the invention, the sunvisor extender can then be attached as a bridging member between the automobile's sunvisors in the manner described hereinbefore so as to reduce turbulence in the front seat compartment.

Obviously, numerous modifications and variations of the present invention are possible in light of the above teachings. It is therefore to be understood that, within the scope of the claims appended hereto, the invention may be practiced otherwise than as specifically disclosed herein.

What is claimed is:

1. A wind baffle for convertible automobiles comprising:
    a sheet of substantially rigid, transparent material;
    a rod having ends attachable to respective inner side body surfaces of a convertible automobile;
    said rod including means for adjusting the length thereof; and
    means for affixing said sheet to said rod such that said sheet can be held in place behind the front seat compartment of said convertible automobile to prevent wind currents from passing from the rear of said convertible automobile to the front seat compartment.

2. The wind baffle of claim 1, wherein said rod is a spring-biased, telescoping rod.

3. The wind baffle of claim 1, wherein said means for affixing said sheet to said rod comprises a set of ring clips attached to said sheet for affixing said sheet to said rod at a plurality of respective locations.

4. The wind baffle of claim 3, further comprising respective strips of self-sticking material mounted on said rod at said plurality of respective locations and respective mating strips of said self-sticking material attached to respective inside surfaces of said ring clips such that said ring clips can be attached to said rod at said respective locations.

5. The wind baffle of claim 4, wherein said self-sticking material is VELCRO ® and said ring clips are SUPER KLIPS ®.

6. The wind baffle of claim 3, wherein said ring clips each have one substantially flat outside surface portion which can be brought into abutment with said sheet for attaching said ring clip thereto.

7. The wind baffle of claim 6, further comprising said flat outside surface portions of said ring clips having an adhesive tape thereon such that, when the backing of said tape is removed, said flat surface portions of said ring clips can readily adhere to said sheet.

8. The wind baffle of claim 6, further comprising said flat surface portions of said ring clips having at least one hole therein and said baffle further comprising a plurality of nuts and bolts for connecting said flat surface portions to said sheet such that one of said bolts passes through said flat surface portion hole and through a hole in said sheet to connect with one of said nuts.

9. The wind baffle of claim 7, further comprising said flat surface portions of said ring clips having at least one hole therein and said baffle further comprising a plurality of nuts and bolts for connecting said flat surface portions to said sheet such that one of said bolts passes through said flat surface portion hole and through a hole in said sheet.

10. The wind baffle of claim 2, wherein said ends are tips made of elastic material.

11. The wind baffle of claim 10, further comprising a pair of closet pole sockets attached to said respective inner side body surfaces of said automobile and into which said tips of elastic material are fitted to abut said respective inner side body surfaces.

12. The wind baffle of claim 11, wherein one of said pair of closet pole sockets comprises a bottom, a C-shaped member integral with said bottom, and means for sealing said bottom to one of said respective inner side body surfaces.

13. The wind baffle of claim 11, wherein the other of said pair of closet pole sockets comprises a bottom, an O-shaped member integral with said bottom, and means for sealing said bottom to the other of said respective inner side body surfaces.

14. The wind baffle of claim 11, wherein said sealing means comprises a tape with adhesive on both sides thereof.

15. The wind baffle of claim 1, wherein the width of said sheet is such that it extends approximately from the center of one headrest in said front seat compartment to the center of the other headrest in said front seat compartment.

16. The wind baffle of claim 1, further comprising a sunvisor extender detachably mounted across two sunvisors in said front seat compartment of said convertible automobile.

17. The wind baffle of claim 16, wherein said sunvisor extender comprises a bridging member and a pair of strips of self-sticking material mounted thereon for detachably connecting said bridging member to respective strips of said self-sticking material mounted on said two sunvisors.

18. The wind baffle of claim 1, further comprising said sheet having a substantially straight bottom with a cutout in the central section of said bottom to enable said sheet to rest on automobile floors with an elevated central section running from front to back of said automobile.

19. A wind baffle apparatus in kit form, said kit comprising:
    a sheet of substantially rigid, transparent material;

a rod having ends attachable to respective inner side body surfaces of a convertible automobile;

said rod including means for adjusting the length thereof;

means for affixing said sheet to said rod such that said sheet can be held in place behind the front seat compartment of said convertible automobile to prevent wind currents from passing from the rear of said convertible automobile to the front seat compartment; and a sunvisor extender detachably mounted across two sunvisors in said front seat compartment of said convertible automobile.

20. The wind baffle apparatus of claim 19, wherein said sunvisor extender comprises a bridging member and a pair of strips of self-sticking material mounted thereon for detachably connecting said bridging member to respective inner strips of said self-sticking material mounted on said two sunvisors.

21. A method for constructing a wind baffle for a convertible automobile, said method comprising the steps of mounting an adjustable length rod across the rear seat compartment against respective inner side walls of said convertible automobile;

affixing a plurality of strips of self-sticking material to said rod at spaced intervals;

respectively connecting a plurality of ring clips having strips of said self-sticking material on inner arcuate surface thereof to said plurality of strips of self-sticking material affixed to said rod; and moving a sheet of transparent material whose bottom rests on the floor of said rear seat compartment into contact with respective flat outer surfaces of said ring clips mounted on said rod; and affixing said respective flat outer surfaces of said ring clips to said sheet.

22. The method of claim 21, further comprising mounting closet pole sockets on respective inner side walls of said convertible automobile to secure said adjustable length rod to said respective inner side walls of said convertible automobiles.

* * * * *